United States Patent
Freudelsperger (10) Patent No.: US 7,646,156 B2
(45) Date of Patent: Jan. 12, 2010

(54) SHELF STORAGE SYSTEM WITH ENERGY RECYCLING

(75) Inventor: Karl Freudelsperger, Hart bei Graz (AT)

(73) Assignee: Knapp Logistik Automation GmbH, Hart Bei Graz (AT)

( * ) Notice: Subject to any disclaimer, the term of this patent is extended or adjusted under 35 U.S.C. 154(b) by 483 days.

(21) Appl. No.: 11/569,667

(22) PCT Filed: Apr. 29, 2005

(86) PCT No.: PCT/AT2005/000148

§ 371 (c)(1), (2), (4) Date: Jan. 23, 2007

(87) PCT Pub. No.: WO2005/117248

PCT Pub. Date: Dec. 8, 2005

(65) Prior Publication Data

US 2009/0021023 A1 Jan. 22, 2009

(30) Foreign Application Priority Data

May 28, 2004 (AT) .............................. A 935/2004

(51) Int. Cl.
*F03G 7/08* (2006.01)
*H02P 3/14* (2006.01)
(52) U.S. Cl. ..................... 318/87; 318/89; 318/376
(58) Field of Classification Search .............. 318/625, 318/626, 62, 87, 89, 375, 376
See application file for complete search history.

(56) References Cited

U.S. PATENT DOCUMENTS

| | | | | |
|---|---|---|---|---|
| 5,704,250 | A | * | 1/1998 | Black .................... 74/89.3 |
| 5,814,956 | A | | 9/1998 | Kono et al. |
| 6,253,901 | B1 | | 7/2001 | Hintz et al. |
| 2001/0048277 | A1 | | 12/2001 | Naito |

FOREIGN PATENT DOCUMENTS

| | | |
|---|---|---|
| DE | 38 12312 A1 | 4/1988 |
| DE | 198 31 204 A1 | 1/2000 |
| DE | 102 34 150 A1 | 5/2003 |
| EP | 0 739 831 B1 | 2/2000 |
| EP | 1 061 035 A | 12/2000 |
| JP | 03 183389 A | 8/1991 |
| JP | 2000 355405 A | 12/2000 |
| JP | 2001 261246 A | 7/2001 |

* cited by examiner

*Primary Examiner*—Bentsu Ro
(74) *Attorney, Agent, or Firm*—Workman Nydegger (57) ABSTRACT

In a shelf storage system (1) comprising at least two shelf units (1a-1d), wherein each shelf unit has a separate moveable shelf feeder device (5) with electric drive motors (6, 7, 8), and comprising an electric energy supply circuit (P, S1, S2, S3) which supplies the shelf units (1a-1d) with electric energy, the shelf feeder devices (5) are designed for recycling electric energy produced in their drive motors (6, 7, 8) by operating them as generators back into the electric energy supply circuit, with the electric energy supply circuit distributing electric energy recycled by the shelf feeder devices among the shelf units according to requirements (arrow ES1, arrow EP).

25 Claims, 5 Drawing Sheets

SHELF STORAGE SYSTEM WITH ENERGY RECYCLING

The invention relates to a shelf storage system comprising at least two shelf units, wherein each shelf unit has a separate moveable shelf feeder device with electric drive motors, and comprising an electric energy supply circuit for supplying the shelf units with electric energy.

Such a shelf storage system comprising at least two shelf units is known, for example, from DE 102 34 150 A1.

Furthermore, the invention relates to a process for the energy-saving operation of shelf feeder devices in a shelf storage system which has an electric energy supply circuit for supplying the shelf feeder devices with electric energy, wherein the shelf feeder devices have electric drive motors for performing motion sequences such as, e.g., driving and lifting motions and the drive motors are designed for recycling electric energy produced by them by being operated as generators back into the electric energy supply circuit.

In recent years, shelf storage systems have attained such a size that, meanwhile, the problem has often arisen as to how to provide the electric energy necessary for operating the shelf storage systems. For example, shelf storage systems comprising 25 shelf lanes often require an electric power of 4 MVA and more be provided. Since electric powers that high frequently are not available at the locations of shelf storage systems, it is necessary in such cases to operate the shelf storage systems below their theoretically possible throughput capacity, for example, by simultaneously moving only a certain number of shelf feeder devices or by drastically reducing the accelerations of the shelf feeder devices so as to bring about, in this manner, a lower current consumption of the electric drive motors of the shelf feeder devices, whereby electric peak loads are avoided. It is, however, extremely unsatisfactory both for the manufacturers of shelf storage systems and for the operators thereof if, due to external circumstances, the theoretically possible capacity of shelf storage systems cannot be utilized fully. This all the more since the pressure of time is constantly growing for operators of shelf storage systems as a result of the "just in time" deliveries which, meanwhile, are generally demanded.

Thus, there is a strong demand for shelf storage systems as well as processes for the energy-saving operation of shelf feeder devices in a shelf storage system, wherein the demand for electric energy has been substantially reduced as compared to known shelf storage systems and operating methods.

The present invention solves said problem by developing further the initially mentioned shelf storage system according to the characterizing features of claim 1 as well as by providing a process for the energy-saving operation of shelf feeder devices in a shelf storage system having the features of claim 11. Advantageous embodiments of the invention are set forth in the dependent claims.

The shelf storage system according to the invention comprises at least two shelf units, wherein each shelf unit has a separate moveable shelf feeder device with electric drive motors. An electric energy supply circuit supplies the shelf units with electric energy, wherein the shelf feeder devices are designed for recycling electric energy produced in their drive motors being operated as generators back into the electric energy supply circuit and the electric energy supply circuit is designed for distributing electric energy recycled by the shelf feeder devices between the shelf units according to requirements. Due to these measures according to the invention, it is possible to achieve an energy saving of up to 20% in comparison with conventional shelf storage systems.

In order to be able to implement shelf storage lanes having a length of 100 metres and more, in which, in each case, one shelf feeder device is moving, it is provided in a preferred embodiment of the invention that the shelf feeder devices are connected to the electric energy supply circuit via collectors such as, e.g., sliding rails. The problems of entanglement and fracture, which are associated with conventional helix cables, are thereby avoided.

For relatively large shelf storage systems according to the invention, it proves to be advantageous if, for increasing the stability of the electric energy supply, the electric energy supply circuit comprises a primary circuit connected to an energy supply network and intermediate circuits allocated to the shelf units, with electric energy converters being interposed between the primary circuit and the intermediate circuits. In order to achieve the best possible energy balance throughout the entire shelf storage system, in one embodiment of the invention electric energy converters can be used which are designed for recycling electric energy back into the primary circuit, which electric energy has been fed back into the intermediate circuits by the shelf feeder devices. Thereby, the energy which has been fed back can be distributed among the intermediate circuits. Additionally or alternatively, one intermediate circuit can supply several shelf units with electric energy and the electric energy converter associated to the intermediate circuit can be designed for distributing the electric energy fed back into the intermediate circuit among the shelf units connected to the same, according to requirements.

In a particularly advantageous embodiment of the shelf storage system according to the invention, the primary circuit is an alternating current circuit and the intermediate circuits are designed as direct current circuits, wherein the energy converters between the primary circuit and the intermediate circuits are designed as AC/DC converters. Advantageously, the drive motors of the shelf feeder devices are designed as direct current motors with an attached motor controller. Due to these measures according to the invention, it is possible to achieve a further saving of electric energy, which can amount to up to 50%, as compared to conventional shelf storage systems which are operated by alternating current, in particular rotary current. This saving can be attributed to the fact that, based on the direct current technology and particularly the interaction with electric direct current motors comprising an integrated control unit, the shelf feeder devices can be constructed without a switch cabinet, which involves a reduction in moving mass by 150 to 200 kg.

In the shelf storage system according to the invention, the shelf feeder devices are provided with such drive motors which, during braking operations, recycle electric energy produced inside them being operated as generators back into the electric energy supply circuit. In a further embodiment of the invention, it is thus possible to do without electric braking resistors in the shelf feeder devices, which braking resistors are used, in conventional shelf feeder devices, for releasing the kinetic braking energy as thermal energy. Due to the measure according to the invention, a further reduction in the mass of the shelf feeder devices is achieved, and there are no problems with heat dissipation. By dispensing with braking resistors, the shelf feeder devices can also be constructed at lower costs than what is customary.

In order to be able to operate an electric load management on the shelf storage system according to the invention, in a further embodiment of the invention, the shelf feeder devices are provided with sensors for detecting the electric current or power consumption or delivery of the drive motors. For implementing the load management, it is advantageous if a control computer is provided which controls motion sequences of the shelf feeder devices such that electric energy fed back into the energy supply circuit by shelf feeder devices is used for activating or accelerating motion sequences of other shelf feeder devices.

The process according to the invention for the energy-saving operation of shelf feeder devices in a shelf storage system which has an electric energy supply circuit for supplying the shelf feeder devices with electric energy, wherein the shelf feeder devices have electric drive motors for performing motion sequences such as, e.g., driving and lifting motions and the drive motors are designed for recycling electric energy produced by them being operated as generators back into the electric energy supply circuit, is characterized in that the motion sequences are controlled such that electric energy fed back into the energy supply circuit by at least one drive motor is used for activating or accelerating other drive motors. Due to this load management process, up to 20% of the consumption of electric energy can be saved in comparison with conventional load management processes.

According to a variant of the process according to the invention, the electric energy fed back into the energy supply circuit by the at least one drive motor is used for activating or accelerating other drive motors of the same shelf feeder device, with the control of the motion sequence preferably occurring directly at the shelf feeder device. Said local control of the motion sequence directly at the shelf feeder device disburdens a superordinate central control computer to a significant extent. Alternatively, a higher load on a central control computer can be accepted in support of an as uniform as possible distribution of the recycled electric energy across the entire shelf system by using the electric energy fed back into the energy supply circuit by the at least one drive motor for activating or accelerating drive motors of other shelf feeder devices, with the central control computer exerting control. A variant of the process according to the invention, which variant is favourable in terms of control engineering, is characterized in that the electric energy fed back into the energy supply circuit by the drive motors is ascertained by determining actual current values at the shelf feeder devices.

For a simple and stable control, it proves to be advantageous if motion profiles are predefined from which the motion sequences of the shelf feeder devices can be assembled, with the motion profiles comprising characteristic current consumption values and current delivery values, respectively, of the drive motors performing the motion profile, and the electric energy fed back into the energy supply circuit by the drive motors is evaluated from the predefined motion profiles from which the respective motion sequences of the shelf feeder devices which are to be performed are assembled.

In the following, the invention is illustrated further by way of a non-limiting exemplary embodiment, with reference to the drawings.

Figure 1:
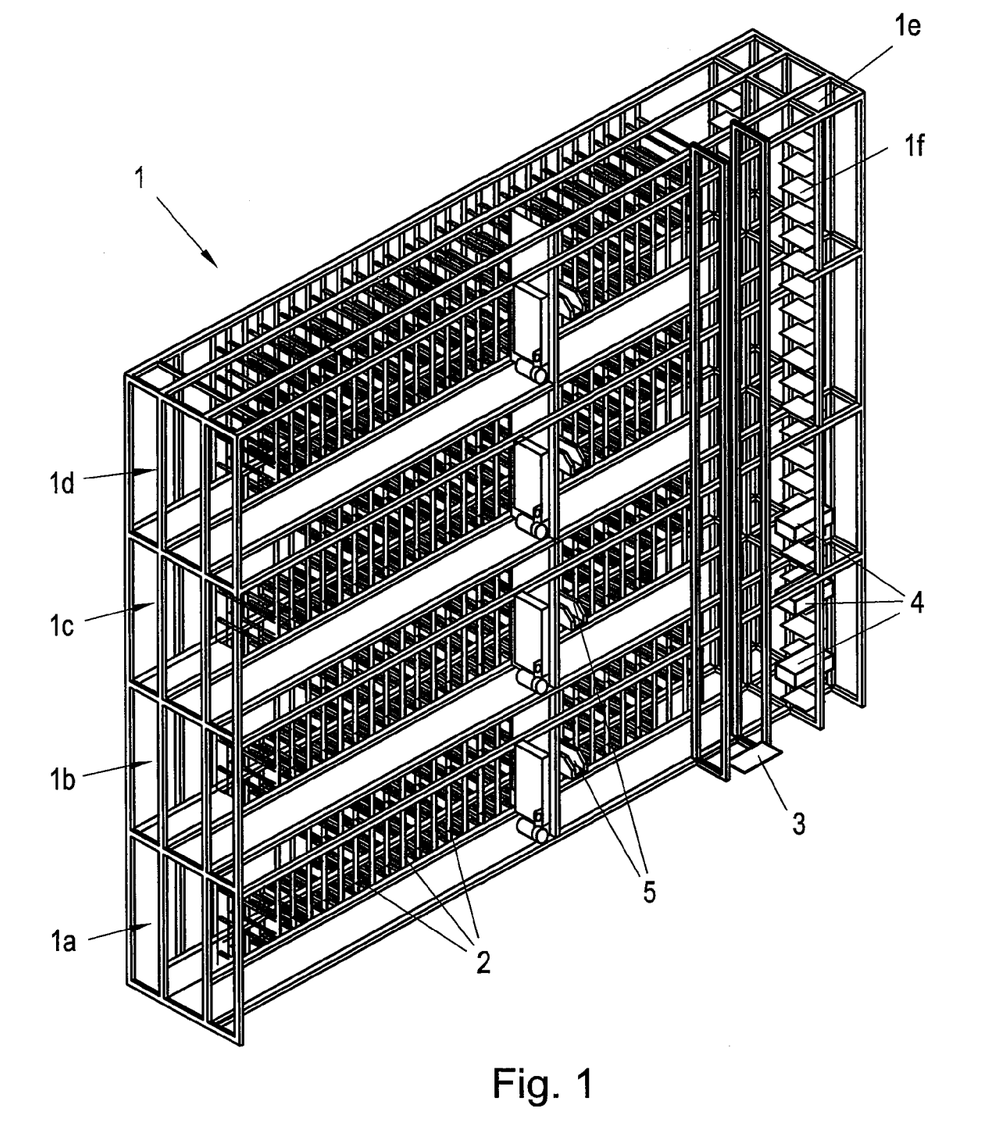
FIG. 1 shows a perspective view of a shelf storage system according to the invention.

FIG. 1 shows a perspective view of a shelf storage system 1 according to the invention. The shelf storage system 1 is designed as a high-bay storage comprising four shelf lanes 1a, 1b, 1c, 1d which are arranged on top of each other. A prezone 1e comprises a lift system 3, enabling the delivery and retrieval of containers 4 to and from the individual shelf lanes 1a-1d. The prezone 1e comprises buffer means 1f for the temporary storage of containers 4 until they can be transferred to the lift system 3 or stored in shelves 2 arranged on top of and next to each other, with a plurality of said shelves being allocated to each shelf lane. For storing the containers 4 in and retrieving them from the shelves 2, a shelf feeder device 5 is provided in each shelf lane 1a-1d, which shelf feeder device is mechanically coupled to the allocated shelf lane so that it is moveable in said shelf lane. The shelf lanes are not specifically limited with regard to their length, the respective dimensioning is done by a person skilled in the art in consideration of the available base area and the moving times of the shelf feeder devices which experience an increase with an increasing length. Shelf lanes of more than 100 m (e.g. up to 200 m) might prove to be suitable. It should be mentioned that, in the present exemplary embodiment, the shelf storage system 1 is indeed designed as a high-bay storage system, which, however, is not essential for the invention. The shelf lanes in the shelf storage system can also be arranged next to each other or both next to each other and on top of each other. It is also evident that, instead of containers for the storage of products, the products to be stored can also be stored directly in the shelves and retrieved therefrom in the shelf storage system according to the invention.

Figure 2:
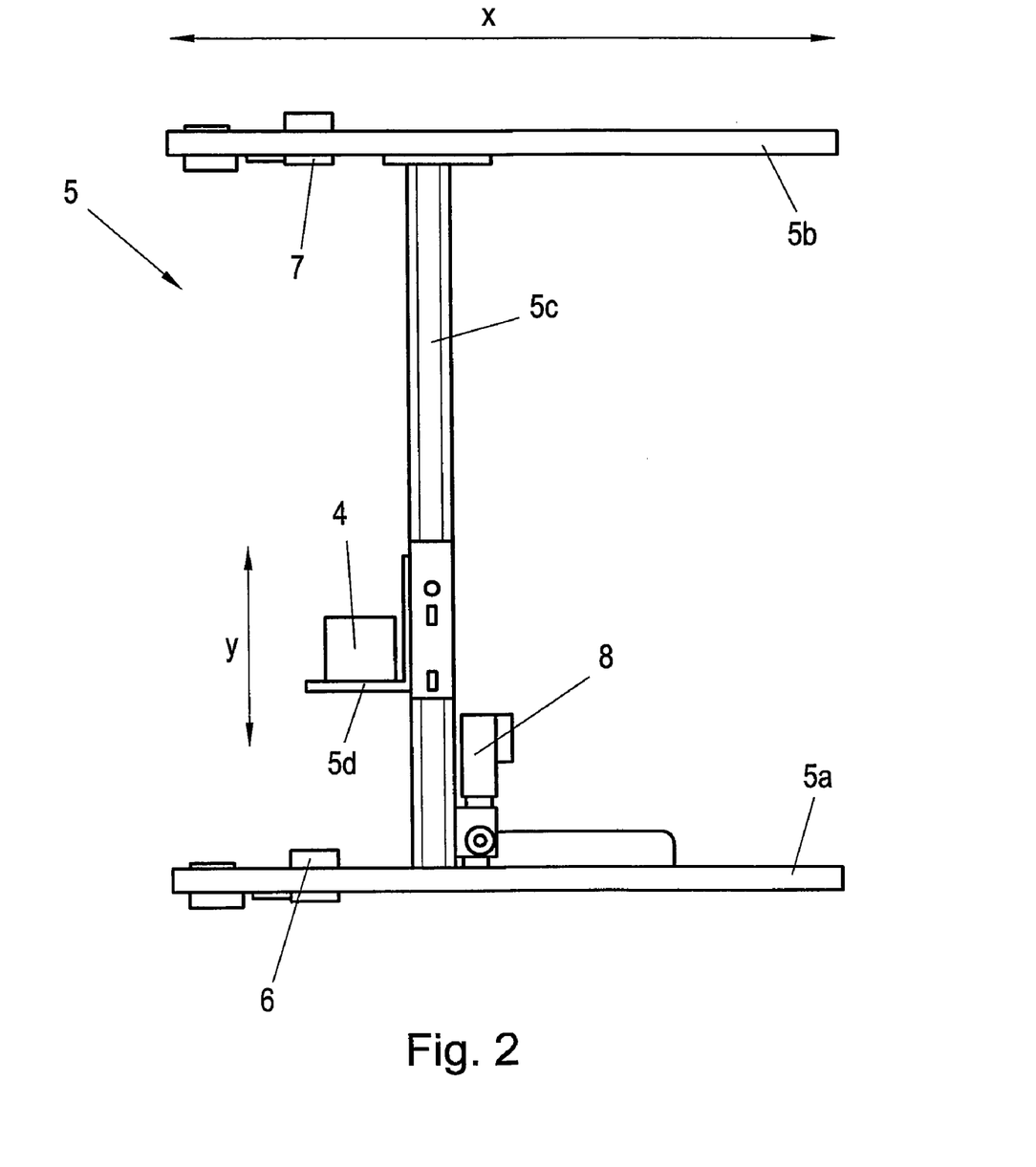
FIG. 2 shows a vertical section of a shelf feeder device according to the invention.

An exemplary embodiment of a shelf feeder device 5 used in the invention is shown in side view in FIG. 2. The shelf feeder device 5 has a lower drive module 5a and an upper drive module 5b with a moving pole 5c extending therebetween. An electric drive motor 6 is attached to the lower drive module 5a, a further electric drive motor 7 is attached to the upper drive module 5b. The two drive motors are responsible for moving the shelf feeder device 5 in the direction of double arrow x. Another drive motor 8 is attached to the moving pole 5c, which drive motor permits the raising and lowering (in the direction of double arrow y) of a load pick-up device 5d attached to the moving pole 5c. A container 4 is located on the load pick-up device 5d. The load pick-up device 5d can be designed either as a gripper or as a lifter. In the first case, it grasps containers 4 and pulls them from shelves (in a direction leaving the plane of the drawing) and pushes containers 4 into shelves, respectively, in the second case, it has a bracket not illustrated here, which reaches under containers placed in shelves, lifts them and pulls them out by retracting the bracket and sets them down in shelves, respectively, by applying the reverse sequence of motions. The shelf feeder device 5 is thus able to move containers 4 and products to be stored, respectively, in three mutually orthogonal directions. The electric drive motors 6, 7, 8 are designed as direct current position motors which are provided with integrated control units so that no switch cabinet has to be provided on the shelf feeder device 5, which leads to a substantial weight saving.

Figure 3:
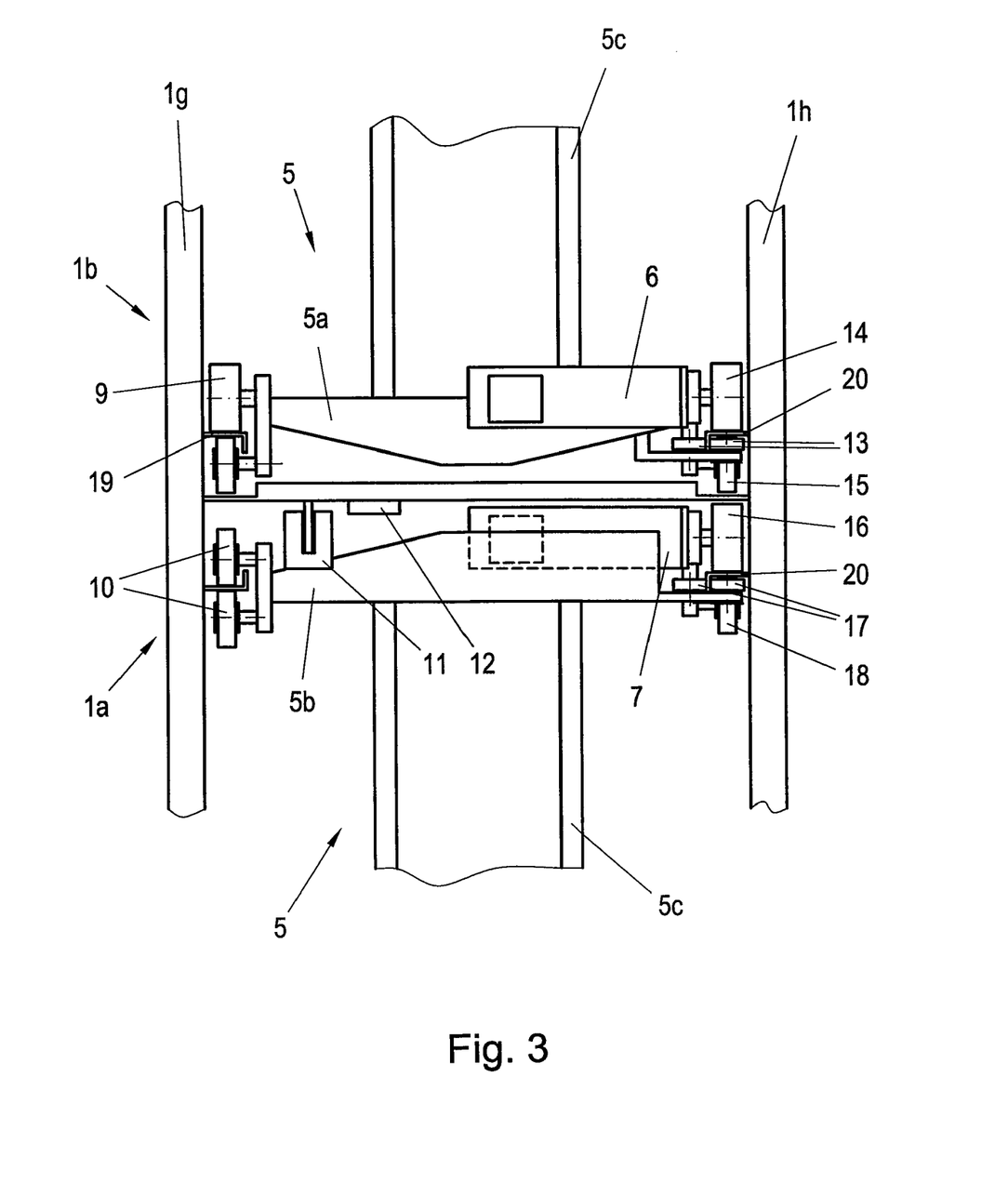
FIG. 3 shows a front view of shelf feeder devices.

In FIG. 3, a front view of a detail of the shelf storage system according to the invention can be seen, wherein an upper section of the shelf lane 1a and a lower section of the shelf lane 1b are illustrated. Guide rails 19, 20 arranged in frame portions 1g, 1h are visible, in which the two shelf feeder devices 5 of the shelf lanes 1a, 1b are moveable. With regard to the shelf feeder device 5 of shelf lane 1b, the lower drive module 5a and a portion of the moving pole 5c can be seen. On the left-hand side, the lower drive module 5a of the shelf feeder device 5 of shelf lane 1b has two guide wheels 9 which run along the guide rail 19; a pair of guide wheels 13 running in guide rail 20 is also provided on the right-hand side. Furthermore, the lower drive motor 6 is attached to the drive module 5a and drives a frictional wheel 14, which, together with a mating frictional wheel 15, permits a slip-free motion of the drive module 5a along the guide rail 20. With regard to the shelf feeder device 5 of shelf lane 1a, the upper drive module 5b and a detail of the moving pole 5c are illustrated. On the left-hand side of the drive module 5b, two guide wheels 10 are provided which run along the guide rail 19; on the right-hand side of the drive module 5b, a pair of guide wheels 17 running in guide rail 20 is provided. The upper drive motor 7 attached to the upper drive module 5b drives a frictional wheel 16, which, together with a mating frictional wheel 18, permits a slip-free motion of the drive module 5b along the guide rail 20. Furthermore, an odometer 11 and a conductor rail 12 of shelf lane 1a are illustrated in FIG. 3. The odometer indicates the current, absolute or relative position of the shelf feeder device 5 in the x-direction. The conductor rail 12 supplies the shelf feeder device 5 with electric energy and absorbs electric energy produced by the drive motor 7 being operated as a generator or by the other drive motors of the shelf feeder device being operated as generators, respectively, which are not illustrated here.

Figure 4:
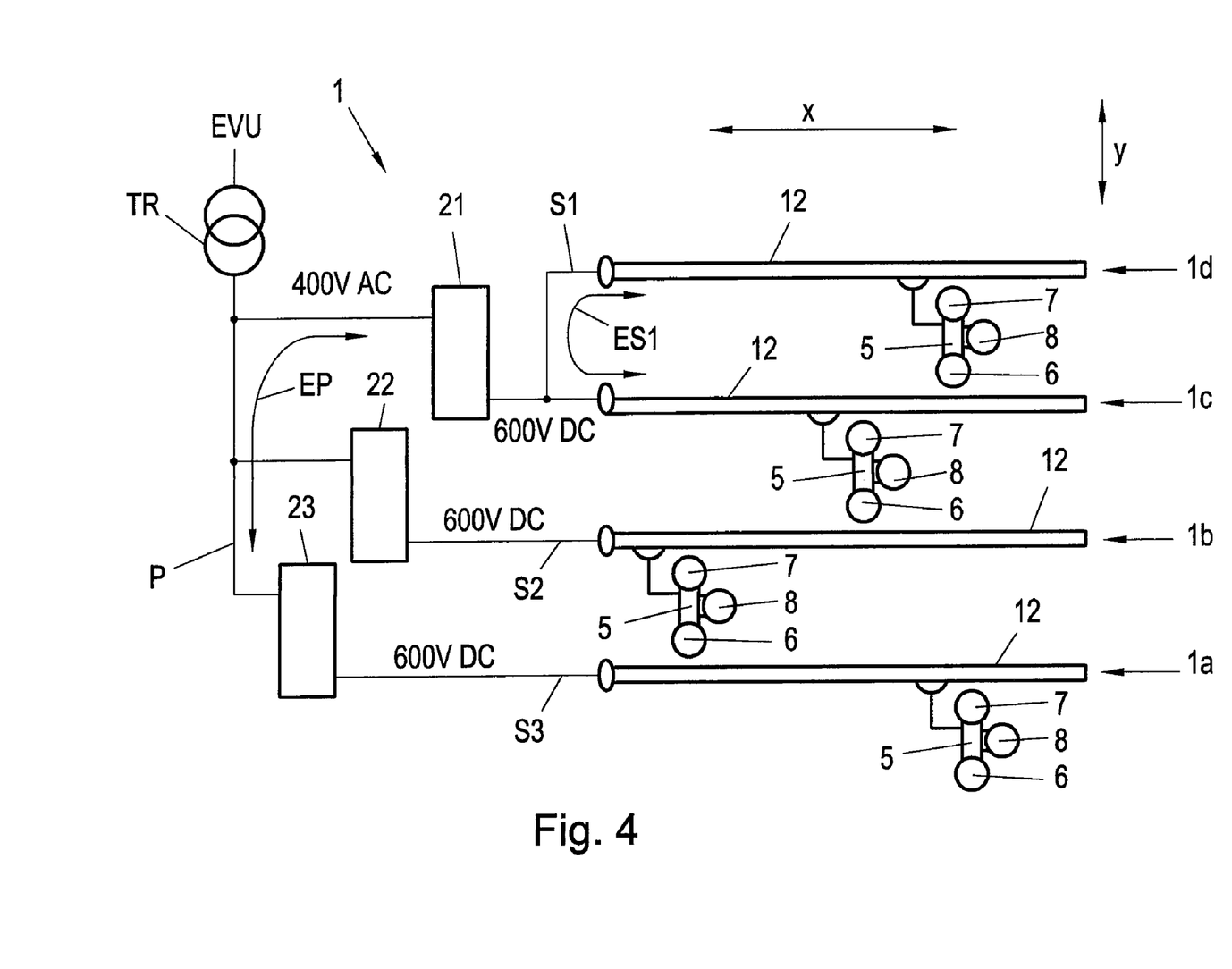
FIG. 4 shows a diagram of an electric energy supply according to the invention of a shelf storage system.

In FIG. 4, a diagram of the electric energy supply of the shelf storage system 1 according to the invention is illustrated. An electric alternating voltage having the required power and being provided by an electric supply company EVU is supplied to the shelf storage system 1, which alternating voltage is transformed into an appropriate voltage, e.g., of 400V AC, in a transformer TR. The transformed alternating voltage is fed into a primary circuit P of the electric energy supply circuit of the shelf storage system. Energy converters 21, 22, 23, which are designed as AC/DC converters and convert the alternating voltage supplied to them into a direct voltage of 600 V DC, are connected to the primary circuit P of the electric energy supply circuit. The output terminals of the energy converters 21, 22, 23 are, in each case, connected to an electric intermediate circuit S1, S2, S3, wherein the intermediate circuits S2 and S3 supply, in each case, one conductor rail 12 of a shelf lane 1a or 1b, respectively, with electric energy, and the intermediate circuit S1 supplies two conductor rails 12, i.e., the two shelf lanes 1c and 1d, with electric energy. Via sliders, a moveable shelf feeder device 5 is, in each case, connected to the conductor rails 12 of each shelf lane, which shelf feeder device is moveable in the x-direction via direct current drive motors 6, 7 for the purpose of horizontally moving the shelf feeder device. Another direct current motor 8 is provided for the lifting motion of a load pick-up device in the y-direction. All direct current motors 6, 7, 8 are designed such that, during braking and deceleration motions, respectively, they recycle the electric energy (=braking energy) produced in the motor by operating it as a generator back into the associated intermediate circuit S1, S2, S3. The electric intermediate circuit S1 is thereby designed such that energy recycled by a shelf feeder device of one shelf lane 1c or 1d via the conductor rail 12 is made available for the other shelf lane 1d or 1c according to requirements (double arrow ES1).

Furthermore, the energy converters 21, 22, 23 are designed such that they recycle electric energy, which is currently not required in the respective intermediate circuits, back into the primary circuit P, where said energy will be distributed between the energy converters 21, 22, 23 according to requirements, which energy has been fed back into the intermediate circuits S1, S2, S3 by the drive motors 6, 7, 8 of the shelf feeder devices 5 (double arrow EP).

Figure 5:
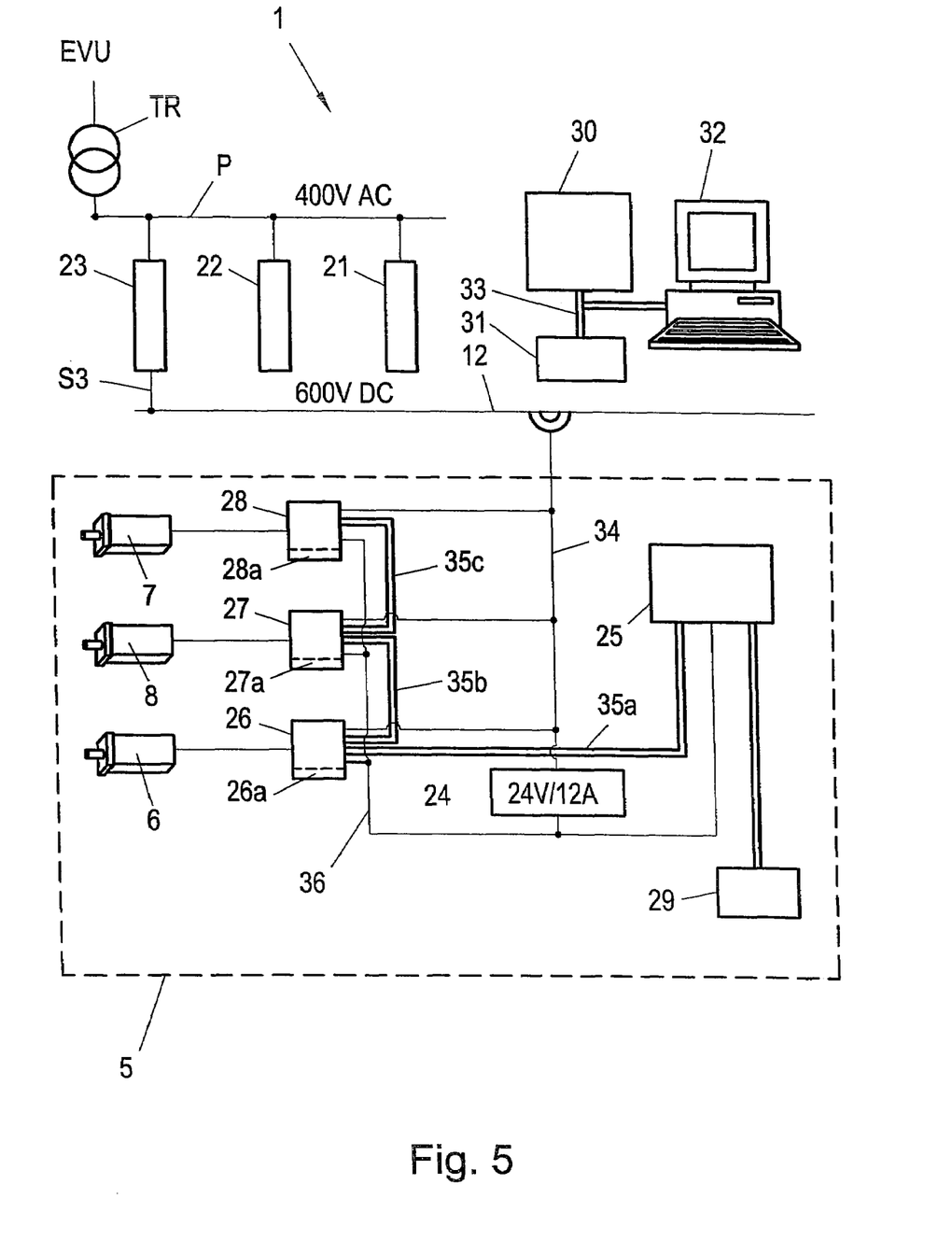
FIG. 5 shows a block diagram of electric and electronic components of a shelf storage system according to the invention.

For the following description, also FIG. 5 is now referred to which shows a block diagram of electric and electronic components of the shelf storage system 1 and in particular of a shelf feeder device 5. The electric drive motors 6, 7, 8 are designed as position motors, which are direct current motors comprising motor controllers 27, 28, 29 that are integrated or arranged in close proximity to the motors in the shelf feeder device 5. By providing the position motors, switch cabinets on the shelf feeder devices 5 can be omitted, which involves a substantial reduction in mass of up to 200 kg and, associated therewith, a corresponding reduction in the required operating power. Since, according to the invention, the drive motors 6, 7, 8 and the electric energy supply of the shelf storage system are designed such that electric energy produced in the motors during braking by operating them as generators is fed back into the energy supply circuit, it is possible to do without electric braking resistors in the shelf feeder devices according to the invention, as opposed to conventional shelf storage systems, said braking resistors being provided, in conventional shelf storage systems, for the conversion of electric braking energy into heat. Due to this measure according to the invention, on the one hand, the mass of the shelf feeder devices is further reduced, and problems with the required dissipation of thermal energy generated by braking resistors are also avoided. The motor controllers 27, 28, 29 are provided with sensors 27a, 28a, 29a for detecting the electric current or power consumption or delivery of the drive motors.

Suitably, the distribution of the electric energy produced by the motors 6, 7, 8 of a shelf feeder device by operating them as generators is initially effected among the other motors 7, 8, 6 of this very shelf feeder device, for example, by using the braking energy of the motors 6, 7 which are responsible for moving the shelf feeder device 5 in the x-direction for starting the motor 8 which is responsible for the lifting motion of the load pick-up device. Electric energy which has not been consumed in the shelf feeder device 5 is fed back into the intermediate circuit and—if several intermediate circuits are interconnected—is divided among the intermediate circuits. Unless the electric energy can be distributed in said intermediate circuits, it will be fed back into the primary circuit P by the energy converters and will be distributed there.

Via an industrial data bus 35a, 35b, 35c such as PROFIBUS®, the motor controllers 27, 28, 29 are interconnected and connected to a storage-programmable control 25 arranged at the shelf feeder device 5. The control 25 makes sure that the energy produced by at least one drive motor of the shelf feeder device 5 by operating it as a generator is made available for the other drive motors of the shelf feeder device by initiating appropriate motion sequences of said motors.

The motor controllers 27, 28, 29 and the storage-programmable control 25 are supplied with 24 V DC via cables 36, with said voltage being supplied by a voltage transformer module 24 the input of which is connected to the conductor rail 12 of intermediate circuit S3. The motors 6, 7, 8 are in turn supplied with 600 V DC by the conductor rail 12, via the motor controllers 27, 28, 29.

The storage-programmable control 25 is connected to a superordinate storage-programmable control 30 and a central control computer 32 via wireless (e.g. optical or radio) data couplers 29, 31, wherein the data coupler 31, the control 30 and the central control computer 32 are likewise interconnected via an industrial data bus 33 such as PROFIBUS®. By cross-linking all control devices of the shelf storage system, the motions of all shelf feeder devices can be centrally coordinated and monitored by the superordinate storage-programmable control 30, including, for example, also tasks such as ascertaining the electric energy fed back into the energy supply circuit by the drive motors of the shelf feeder devices by determining actual current values at the shelf feeder devices.

The superordinate storage-programmable control 30 or the central control computer 32 are also provided for running a program which provides for an energy-saving operation of the shelf storage system 1 according to the invention. Such programs are known per se by the term "electric load management" and control the operation of the shelf feeder devices such that the electric power absorbed by them remains below a nominal power available to the entire shelf storage system, for example, by limiting the number of the shelf feeder devices that are moved simultaneously or by reducing accelerations of the shelf feeder devices. According to the invention, however, an electric load management is implemented by taking into account the electric energy fed back into the energy supply circuit by shelf feeder devices while the motion sequences of the shelf feeder devices are being controlled, whereby the recycled energy is utilized for activating shelf feeder devices or for accelerating the movement thereof.

In a preferred embodiment of the electric load management process according to the invention, motion profiles are predefined from which the motion sequences of the shelf feeder devices are assembled. Said motion profiles comprise characteristic current consumption values and current delivery values, respectively, of the drive motors performing the motion profile. The electric energy fed back into the energy supply circuit by the drive motors can thus be evaluated from the predefined motion profiles from which the respective motion sequences of the shelf feeder devices which are to be performed are assembled.

The advantages and benefits of the present invention can be summarized as follows:

- Lower energy consumption due to a shelf-lane overlapping utilization of energy produced by operating the drive motors as generators.
- Due to the interaction between the direct current supply of the intermediate circuits and the local position motor drive system (drive mechanisms with integrated control unit), a construction of shelf feeder devices which is almost free of switch cabinets is possible.
- A weight saving and hence a saving in the masses to be moved (energy saving) as a result of the construction which is almost free of switch cabinets.
- As the energy produced by operating drive motors as generators is fed back into the intermediate circuit via collectors, no braking resistors are required on the shelf feeder device. The disadvantages of braking resistors are the costs, the required space and the problems which are associated with the dissipation of heat that has been generated.

What is claimed is:

1. A shelf storage system comprising at least two shelf units, wherein each shelf unit has a separate moveable shelf feeder device with electric drive motors, and comprising an electric energy supply circuit for supplying the shelf units with electric energy, wherein the shelf feeder devices are designed for recycling electric energy produced in their drive motors by being operated as generators back into the electric energy supply circuit and the electric energy supply circuit is designed for distributing electric energy recycled by the shelf feeder devices among the shelf units according to requirements.

2. The shelf storage system according to claim 1, wherein the shelf feeder devices are connected to the electric energy supply circuit via collectors.

3. The shelf storage system according to claim 2, wherein the collectors are conductor rails.

4. The shelf storage system according to claim 2, wherein the electric energy supply circuit comprises a primary circuit connected to an energy supply network and intermediate circuits allocated to the shelf units, with electric energy converters being interposed between the primary circuit and the intermediate circuits.

5. The shelf storage system according to claim 1, wherein the electric energy supply circuit comprises a primary circuit connected to an energy supply network and intermediate circuits allocated to the shelf units, with electric energy converters being interposed between the primary circuit and the intermediate circuits.

6. The shelf storage system according to claim 5, wherein the electric energy converters are designed for recycling electric energy back into the primary circuit, which electric energy has been fed back into the intermediate circuits by the shelf feeder devices.

7. The shelf storage system according to claim 6, wherein one intermediate circuit supplies several shelf units with electric energy and the electric energy converter associated to the intermediate circuit is designed for distributing the electric energy fed back into the intermediate circuit among the shelf units connected to the same, according to requirements.

8. The shelf storage system according to claim 6, wherein the primary circuit is an alternating current circuit, the intermediate circuits are direct current circuits and the energy converters are designed as AC/DC converters.

9. The shelf storage system according to claim 5, wherein one intermediate circuit supplies several shelf units with electric energy and the electric energy converter associated to the intermediate circuit is designed for distributing the electric energy fed back into the intermediate circuit among the shelf units connected to the same, according to requirements.

10. The shelf storage system according to claim 9, wherein the primary circuit is an alternating current circuit, the intermediate circuits are direct current circuits and the energy converters are designed as AC/DC converters.

11. The shelf storage system according to claim 5, wherein the primary circuit is an alternating current circuit, the intermediate circuits are direct current circuits and the energy converters are designed as AC/DC converters.

12. The shelf storage system according to claim 11, wherein the drive motors of the shelf feeder devices are designed as direct current motors with an attached motor controller.

13. The shelf storage system according to claim 1, wherein the shelf feeder devices are designed without electric braking resistors.

14. The shelf storage system according to claim 1, wherein the shelf feeder devices are provided with sensors for detecting at least one of the electric current, power consumption, and delivery of the drive motors.

15. The shelf storage system according to claim 1, wherein a control computer is provided which is designed for controlling motion sequences of the shelf feeder devices such that electric energy fed back into the energy supply circuit by shelf feeder devices is used for at least one of activating and accelerating motion sequences of the shelf feeder devices.

16. A process for the energy-saving operation of shelf feeder devices in a shelf storage system which has an electric energy supply circuit for supplying the shelf feeder devices with electric energy, wherein the shelf feeder devices have electric drive motors for performing motion sequences and the drive motors are designed for recycling electric energy produced by them by being operated as generators back into the electric energy supply circuit, wherein the motion sequences are controlled such that electric energy fed back into the energy supply circuit by at least one drive motor is used for at least one of activating and accelerating other drive motors.

17. The process according to claim 16, wherein the electric energy fed back into the energy supply circuit by the at least one drive motor is used for at least one of activating and accelerating other drive motors of the same shelf feeder device, with the control of the motion sequence preferably occurring directly at the shelf feeder device.

18. The process according to claim 17, wherein the electric energy fed back into the energy supply circuit by the drive motors is ascertained by determining actual current values at the shelf feeder devices.

19. The process according to claim 17, wherein predefining motion profiles from which the motion sequences of the shelf feeder devices can be assembled, with the motion profiles comprising characteristic current consumption values and current delivery values, respectively, of the drive motors performing the motion profile, and by evaluating the electric energy fed back into the energy supply circuit by the drive motors from the predefined motion profiles from which the respective motion sequences of the shelf feeder devices which are to be performed are assembled.

20. The process according to claim 16, wherein the electric energy fed back into the energy supply circuit by the at least one drive motor is used for at least one of activating and accelerating drive motors of other shelf feeder devices, with central control computers exerting control.

21. The process according to claim 20, wherein the electric energy fed back into the energy supply circuit by the drive motors is ascertained by determining actual current values at the shelf feeder devices.

22. The process according to claim 20, wherein predefining motion profiles from which the motion sequences of the shelf feeder devices can be assembled, with the motion profiles comprising characteristic current consumption values and current delivery values, respectively, of the drive motors performing the motion profile, and by evaluating the electric energy fed back into the energy supply circuit by the drive motors from the predefined motion profiles from which the respective motion sequences of the shelf feeder devices which are to be performed are assembled.

23. The process according to claim 16, wherein the electric energy fed back into the energy supply circuit by the drive motors is ascertained by determining actual current values at the shelf feeder devices.

24. The process according to claim 16, wherein predefining motion profiles from which the motion sequences of the shelf feeder devices can be assembled, with the motion profiles comprising characteristic current consumption values and current delivery values, respectively, of the drive motors performing the motion profile, and by evaluating electric energy fed back into the energy supply circuit by the drive motors from the predefined motion profiles from which the respective motion sequences of the shelf feeder devices which are to be performed are assembled.

25. The process according to claim 16, wherein motion sequences include at least one of driving and lifting motions.

\* \* \* \* \*

UNITED STATES PATENT AND TRADEMARK OFFICE
CERTIFICATE OF CORRECTION

PATENT NO.       : 7,646,156 B2                          Page 1 of 1
APPLICATION NO.  : 11/569667
DATED            : January 12, 2010
INVENTOR(S)      : Karl Freudelsperger It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 528 days.

Signed and Sealed this

Sixteenth Day of November, 2010

David J. Kappos
*Director of the United States Patent and Trademark Office*